United States Patent [19]

Makino

[11] Patent Number: 5,585,854
[45] Date of Patent: Dec. 17, 1996

[54] DATA COMMUNICATION APPARATUS FOR MULTI-ADDRESS TRANSMISSION WHICH DIRECTLY TRANSMITS TO THE DESTINATION STATION UPON DETECTING NON-DELIVERY STATUS

[75] Inventor: Tsunehiro Makino, Tokyo, Japan

[73] Assignee: Canon Kabushiki Kaisha, Tokyo, Japan

[21] Appl. No.: 441,953

[22] Filed: May 16, 1995

Related U.S. Application Data

[63] Continuation of Ser. No. 911,719, Jul. 10, 1992, abandoned.

[30] Foreign Application Priority Data

Jul. 12, 1991 [JP] Japan ..................... 3-172010

[51] Int. Cl.$^6$ ................. H04N 1/00; H04N 1/42
[52] U.S. Cl. ............ 358/407; 358/437; 358/400; 455/8
[58] Field of Search ..................... 358/402, 403, 358/405, 407, 434, 437, 440, 468, 400, 500, 406; 340/825.02, 825.52, 825.06, 825.16, 825.18; 370/16; 455/8, 3.1, 5.1; H04N 1/00, 1/42

[56] References Cited

U.S. PATENT DOCUMENTS

| | | | |
|---|---|---|---|
| 4,785,355 | 11/1988 | Matsumoto | 358/257 |
| 4,910,765 | 3/1990 | Matsuse et al. | 379/100 |
| 4,935,608 | 6/1990 | Tanaka | 235/380 |
| 4,937,569 | 6/1990 | Trask et al. | 340/825.52 |
| 5,111,307 | 5/1992 | Yoshino | 358/407 |
| 5,175,634 | 12/1992 | Matsuzaki | 358/407 |
| 5,194,967 | 3/1993 | Nonomura | 358/434 |
| 5,216,520 | 6/1993 | Omura et al. | 358/437 |

FOREIGN PATENT DOCUMENTS

| | | |
|---|---|---|
| 0219867 | 11/1985 | Japan. |
| 0065544 | 3/1990 | Japan. |

OTHER PUBLICATIONS

Globecom '90 IEEE Global Telecommunications Conference & Exhibition, vol. 1, Dec. 2, 1990 (San Diego, CA), pp. 332–338, Chen, K. J., et al., "An Internodal Switching Technique for High Speed Packet Networks", AT&T Bell Laboratories.

Primary Examiner—Safet Metjahic
Attorney, Agent, or Firm—Fitzpatrick, Cella, Harper & Scinto

[57] ABSTRACT

A data communication apparatus for conducting relaying multi-address transmission comprises a detector for detecting the occurrence of a non-delivery status in which data is not transmitted to a relay station or a relay destination station, and a control unit for sending the data directly to the relay destination station without routing the relay station when the non-delivery status is detected by the detector.

10 Claims, 10 Drawing Sheets

| | TYPE | ADDRESS | RESULT OF RELAY |
|---|---|---|---|
| 1 | RELAY STATION | 045-311-274x (RELAY STA 22) | X |
| 2 | MULTI-ADDRESS CALLED STATION | 045-647-625y (DESTINATION 25) | X |
| 3 | MULTI-ADDRESS CALLED STATION | 045-585-163z (DESTINATION 26) | X |
| 4 | RELAY STATION | 011-468-512x (RELAY STA 23) | OK |
| 5 | MULTI-ADDRESS CALLED STATION | 011-261-365y (DESTINATION 27) | OK |
| 6 | MULTI-ADDRESS CALLED STATION | 011-723-114x (DESTINATION 28) | OK |
| 7 | RELAY STATION | 075-215-315x (RELAY STA 24) | OK |
| 8 | MULTI-ADDRESS CALLED STATION | 075-822-132y (DESTINATION 29) | NG |
| 9 | MULTI-ADDRESS CALLED STATION | 075-566-723z (DESTINATION 30) | OK |
| 10 | MULTI-ADDRESS CALLED STATION | 075-745-834w (DESTINATION 31) | OK |

5
RELAY MULTI-ADDRESS CALLING ADDRESS MEMORY

FIG. 10

| | ADDRESS | RESULT OF SENDING |
|---|---|---|
| 1 | 075-822-132y (DESTINATION 29) | NG |
| 2 | 075-566-723z (DESTINATION 30) | OK |
| 3 | 075-745-834w (DESTINATION 31) | OK |

4
RELAY DESTINATION
ADDRESS MEMORY

FIG. 11

| | ADDRESS |
|---|---|
| 1 | 045-311-274x (RELAY STA 22) |
| 2 | 045-647-625y (DESTINATION 25) |
| 3 | 045-585-163z (DESTINATION 26) |
| 4 | 075-822-132y (DESTINATION 29) |

6
NON-DELIVERED DESTINATION
ADDRESS MEMORY

SENDER | PRIMARY RELAY STATIONS | SECONDARY RELAY STATIONS | RELAY DESTINATIONS

DATA COMMUNICATION APPARATUS FOR MULTI-ADDRESS TRANSMISSION WHICH DIRECTLY TRANSMITS TO THE DESTINATION STATION UPON DETECTING NON-DELIVERY STATUS

This application is a continuation of application Ser. No. 07/911,719 filed Jul. 10, 1992 now abandoned.

BACKGROUND OF THE INVENTION

1. Field of the Invention

The present invention relates to a data communication apparatus, and more particularly to a data communication apparatus to be used with a relaying multi-address transmission (or calling) system.

2. Related Background Art

A facsimile device has been known as one of the apparatus of this type.

In the prior art facsimile device, the relaying multi-address transmission is instructed from a relay requesting station to a relaying station together with image information. The relaying station sequentially sends in the multi-address call mode the received image information in accordance with the instruction of multi-address call from the requesting station. When the information is not normally sent and there exists a non-delivery station, the relaying station sends a relay report to the requesting station to inform it of the existence of the non-delivery station. The relay requesting station checks the non-delivery station based on the relay report, manually designates the non-delivery stations one by one and resend the information to those stations.

In order to solve the above inconvenience, it has been proposed to instruct the multi-address transmission from the relay requesting station to the relaying station so that the relaying multi-address transmission is retried only to the non-delivered stations.

However, the above proposal includes the following drawbacks:

(1) When the status of the communication line from a destination station to the relaying station is bad or the relaying station is down or busy for a long time so that the relaying multi-address transmission is not attained, there is a high possibility of non-delivery even if the relaying multi-address transmission is retried. Thus, the document hardly reaches the destination station through the relaying station.

(2) It is normally considered rare case (one station or so) that the information is not normally sent to the destination station from the relaying station and the information is not delivered to the destination station. Thus, if the relaying multi-address transmission is to be retried, the burden of the relaying station increases, which leads to the rise of the communication cost.

The relaying multi-address transmission is disclosed in U.S. Pat. No. 4,785,355, and U.S. patent applications Ser. No. 442,721 (now U.S. Pat. No. 5,196,843 ) filed on Nov. 29, 1989, U.S. Ser. No. 330,826 filed on Mar. 30, 1989, and U.S. Ser. No. 451,185 filed on Dec. 15, 1989 (now U.S. Pat. No. 5,111,307).

However, none of the proposals has solved the above problems.

SUMMARY OF THE INVENTION

It is an object of the present invention to improve a data communication apparatus in the light of the above problems.

It is another object of the present invention to provide a data communication apparatus which can quickly send data to a non-delivered station even if there exists such a station in the relaying multi-address transmission.

It is still another object of the present invention to provide a data communication apparatus which can send data to a non-delivered station quickly and without troublesome procedure even if there exists such a station in the relaying multi-address transmission.

Other objects of the present invention will be apparent from the following detailed description of the preferred embodiments and the accompanying drawings.

DETAILED DESCRIPTION OF THE PREFERRED EMBODIMENTS

The preferred embodiments of the present invention are now explained with reference to the drawings. In the following embodiments, a facsimile device is shown although the present invention is not limited thereto but it is equally applicable to other data communication apparatus such as a telex device.

The relaying multi-address transmission function includes various service functions when it is specifically classified. In the present invention, it is assumed that the apparatus of the present invention is used for a sending station and a relay station where an image is sent from a sending station to a plurality of relay stations and each of the relay stations sends the image to a plurality of relay destination stations (see FIG. 2), and addresses of the relay destination stations are designated by the sending station.

Figure 1:
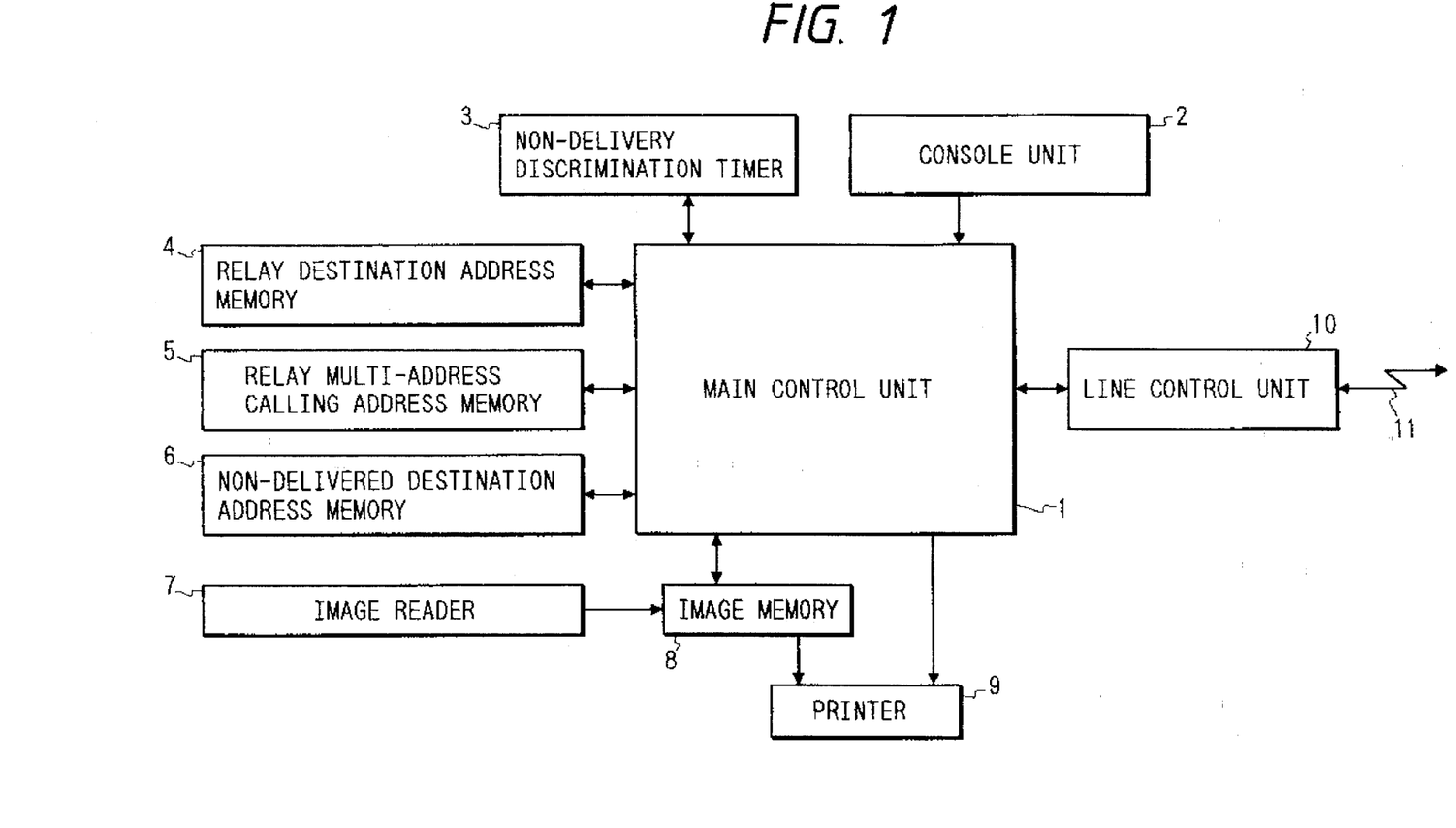
FIG. 1 shows a block diagram of a facsimile device which embodies the present invention.

FIG. 1 shows one embodiment of the present invention. In FIG. 1, numeral 1 denotes a main control unit which controls the entire apparatus and comprises a microcomputer, a ROM, a RAM and others, numeral 2 denotes a console unit through which a user manipulates the apparatus, and numeral 3 denotes a non-delivery check (or discrimination) timer which informs a non-delivery check time to the main control unit 1. A detail of the non-delivery check timer 3 will be described later.

Numeral 4 denotes a relay destination station address memory for storing and managing relay destination station addresses by a relay station, numeral 5 denotes a relaying multi-address transmission address memory for storing and managing addresses of the relay station and the relay destination stations by the sending station, and numeral 6 denotes a non-delivered station address memory for storing and managing addresses of the relay destination stations to which the information has not been delivered in the relaying multi-address transmission mode, by the sending station. Details of the information to be stored in those memories will be described later.

Numeral 7 denotes an image reader for reading a document image, numeral 8 denotes an image memory for storing images to be transmitted and received, numeral 9 denotes a printer for recording an image and printing out a report, numeral 10 denotes a line control unit, and numeral 11 denotes a communication circuit.

Figure 2:
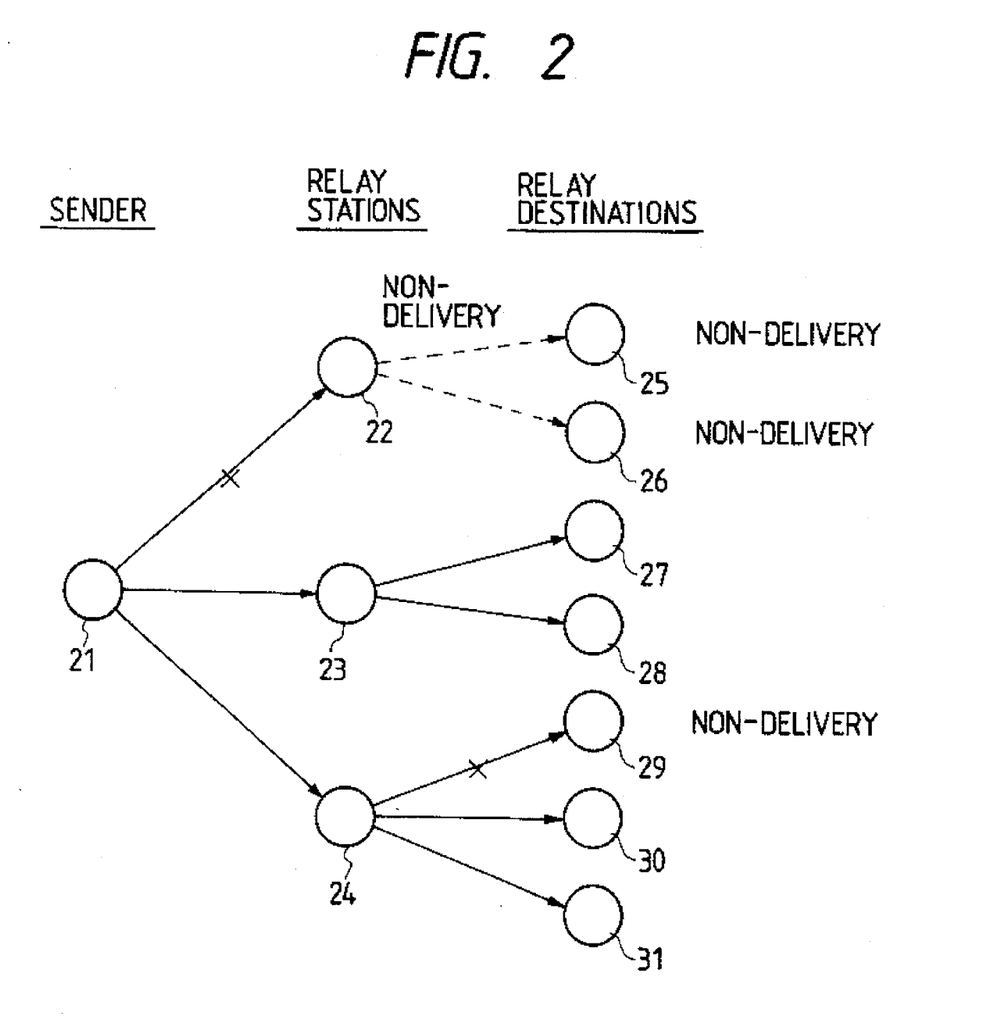
FIG. 2 illustrates an operation of the facsimile device which embodies the present invention.

The facsimile devices of the above construction are used as a sending station and relay stations to conduct the relaying multi-address transmission from a sending station 21 to relay destination stations 25–31 through relay stations 22, 23 and 24 as shown in FIG. 2.

A user at the sending station manipulates the console unit 2 to read an image to be sent to the relay destination stations, by the image reader 7, and store it in the image memory 8. The addresses of all relay stations and relay destination stations to which the image is to be relayed by the multi-address transmission mode are grouped for each relay station, and they are written into the relaying multi-address transmission address memory 5 to designate the relay destination stations.

Figure 9:
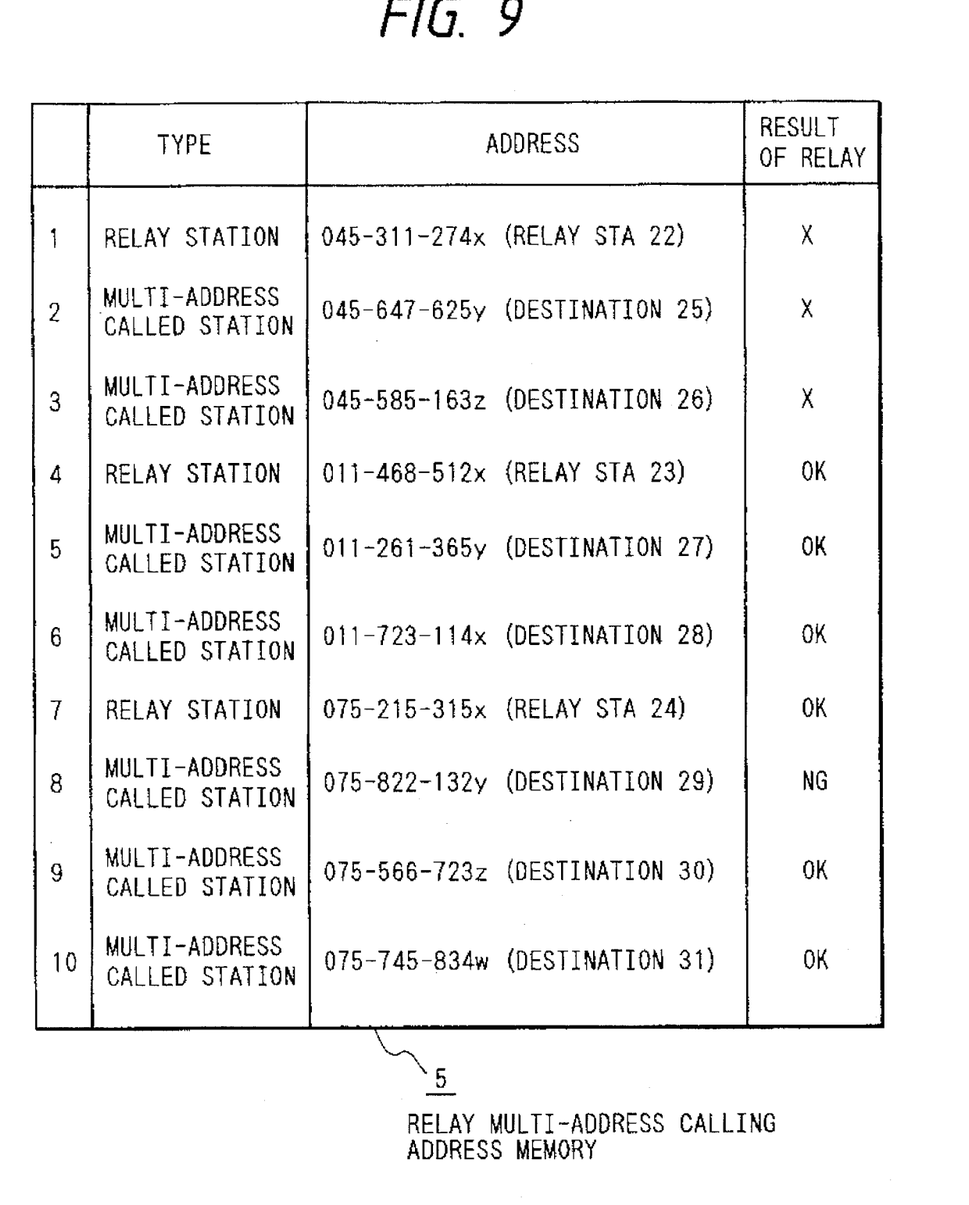
FIG. 9 shows a content of a relaying multi-address transmission address memory.

A table of the information stored and managed in the relaying multi-address transmission address memory 5 of the sending station 21 is shown in FIG. 9, which discriminates the communication address (telephone number) of each station by the relay station and the relay destination station. As shown, the relaying multi-address transmission address memory 5 may have an area for storing a relay (transmission) result for the station.

After the reading of the image and the instruction of the relay destination stations, the user manipulates the console unit 2 to start the relaying multi-address transmission. Thus, the main control unit 1 serially transmits the image data stored in the image memory 8 to which the address information of the relay destination stations has been added in accordance with the address information stored in the relaying multi-address transmission address memory 5, to the respective relay stations 22–24 through the line control unit 10 and the communication line 11.

Each relay station prints out the image data by the printer 9 as required, and stores the relay destination station address information sent from the sending station into the relay destination station address memory 4.

Figure 10:
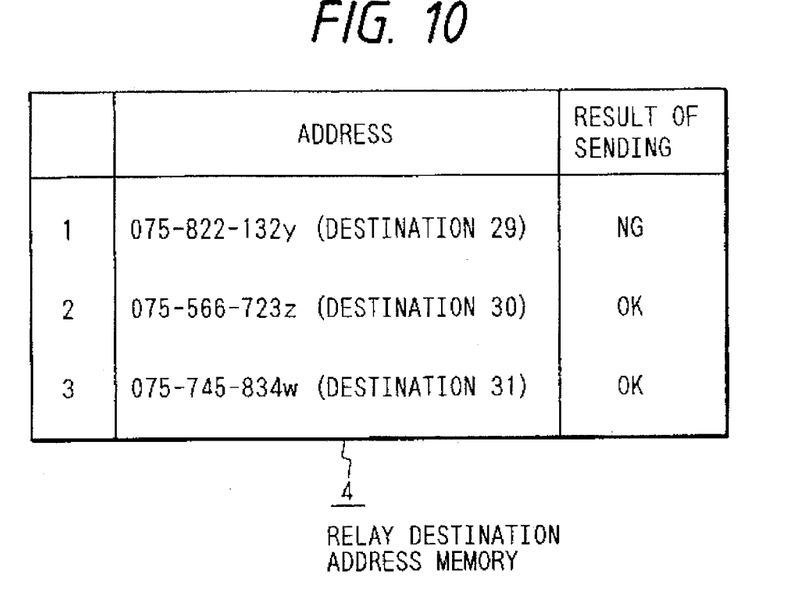
FIG. 10 shows a content of a relay destination station address memory.

The information stored and managed in the relay destination station address memory 4 of the relay station 24 is shown in a table of FIG. 10 in which the adresses (telephone numbers) of the relay destination stations are stored in the relay destination station address memory 4. As shown, the relay destination station address memory 4 may have an area for storing the result of relay (transmission) for the station.

Each of the relay stations 22–24 sequentially sends the image to the relay destination stations in accordance with the table information of the relay destination station address memory 4.

When the transmission is completed, the relay stations 22–24 inform the results of the relaying multi-address transmission to the sending station, which prints it out by the printer 9 to inform the results of the relaying multi-address transmission (whether there exists a non-delivered station or not) to the user.

The above feature is same as that of the prior art relaying multi-address transmission function. It is now assumed that there are non-delivered stations as shown by marks X in FIG. 2 in the relaying multi-address transmission. In FIG. 2, the transmission from the sending station 21 to the relay station 22 is abnormal and hence the transmission to the relay destination stations 25 and 26 is not conducted. In addition, the transmission from the relay station 24 to the relay destination station 29 is not conducted.

Figure 3:
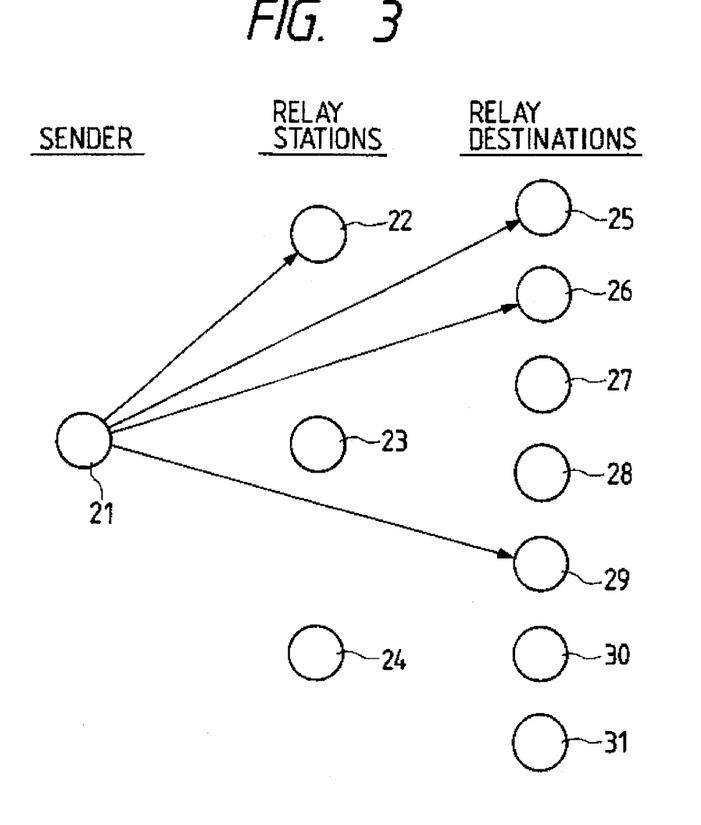
FIG. 3 illustrates an operation of the facsimile device which embodies the present invention.

In the present embodiment, the image is directly retransmitted from the sending station 21 to the relay station 22 and the relay destination stations 25, 26 and 29, as shown in FIG. 3. The direct transmission is now explained.

When such non-delivery occurs, the sending station checks the following conditions to determine the existence of the non-delivered station. Only one of the following conditions, or appropriate ones or all of them may be used as the conditions to determine the non-delivery.

(A) The transmission to the relay station terminates in error or in redial-out. (The non-delivery to the relay station 22 in FIG. 2.)

(B) The relay result information sent from the relay station indicates a non-delivery station. (The non-delivery to the relay destination station 29 of FIG. 2.)

(C) The relay result information to be sent from the relay station is not sent in a predetermined period. (It is considered non-delivery although it may not be actual non-delivery.)

In the condition (C), it is the non-delivery check timer 3 that informs to the main control unit 1 when the predetermined period (hereinafter referred to as a non-delivery check time) has elapsed after the relaying multi-address transmission from the sending station. The predetermined non-delivery check time is set in the non-delivery check timer 3.

The non-delivery check time may be determined in one of the following methods (1)–(5) though they have pros and cons.

Figure 4:
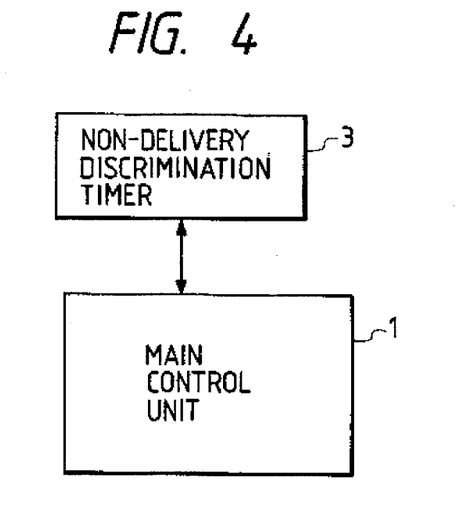
FIG. 4 shows a block diagram for uniformly setting a non-delivery check time.

(1) A uniform time is initially set. For example, in FIG. 4, time data stored in the ROM of the main control unit 1 is set in the non-delivery check timer 3. This method is advantageous in the easiness of construction.

Figure 5:
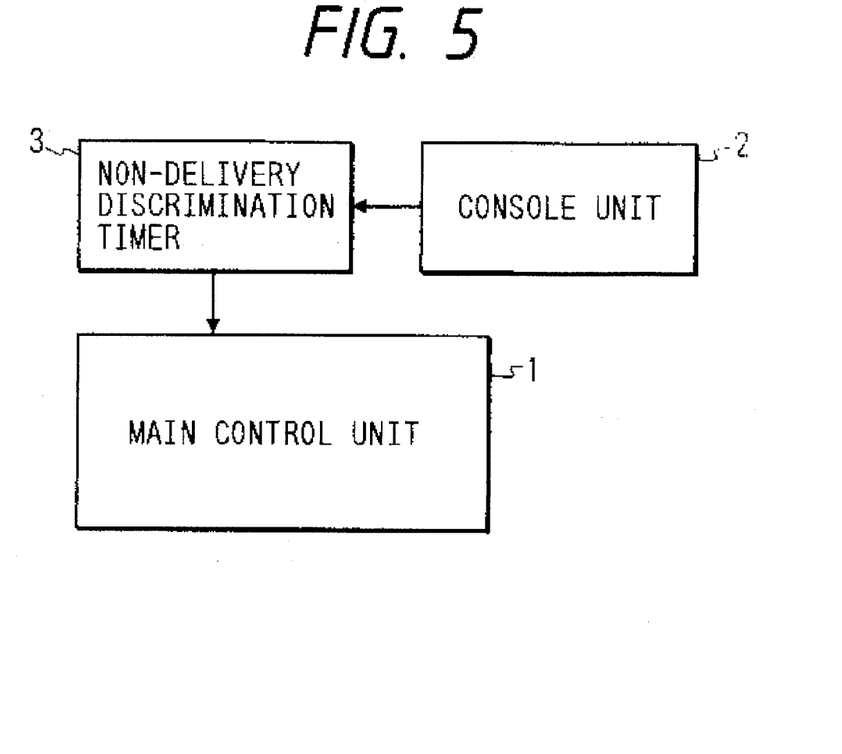
FIG. 5 shows a block diagram for setting the non-delivery check time in accordance with a user entry.

(2) In the relaying multi-address transmission mode, the user enters time data from the console unit 2 to set it in the non-delivery check timer 3 as shown in FIG. 5. This method allows the setting which fits to the actual status with a relatively easy construction.

Figure 6:
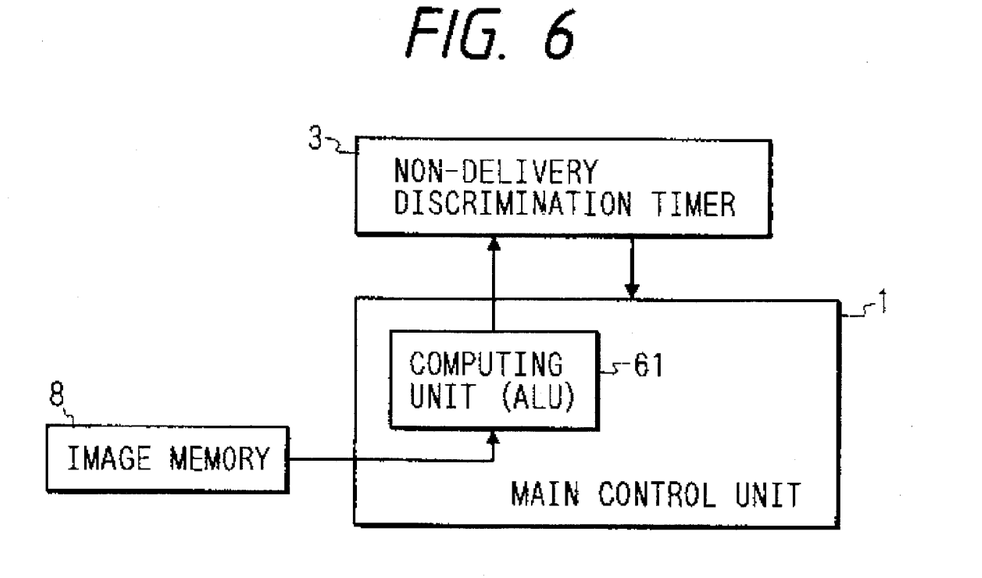
FIG. 6 shows a block diagram for setting the non-delivery check time in accordance with the number of pages of images.

(3) It is set in accordance with the number of pages (or amount of information) of the image to be transmitted. For example, in FIG. 6, the coded or non-coded information on the number of page of the image to be sent in the relaying multi-address transmission is read from the image memory 8, and the corresponding non-delivery check time is calculated based thereon by an ALU (computing unit) 6 in the main control unit 1 and it is set in the non-delivery check timer 3. This method permits the setting which fits to the actual status with less burden of the user.

Figure 7:
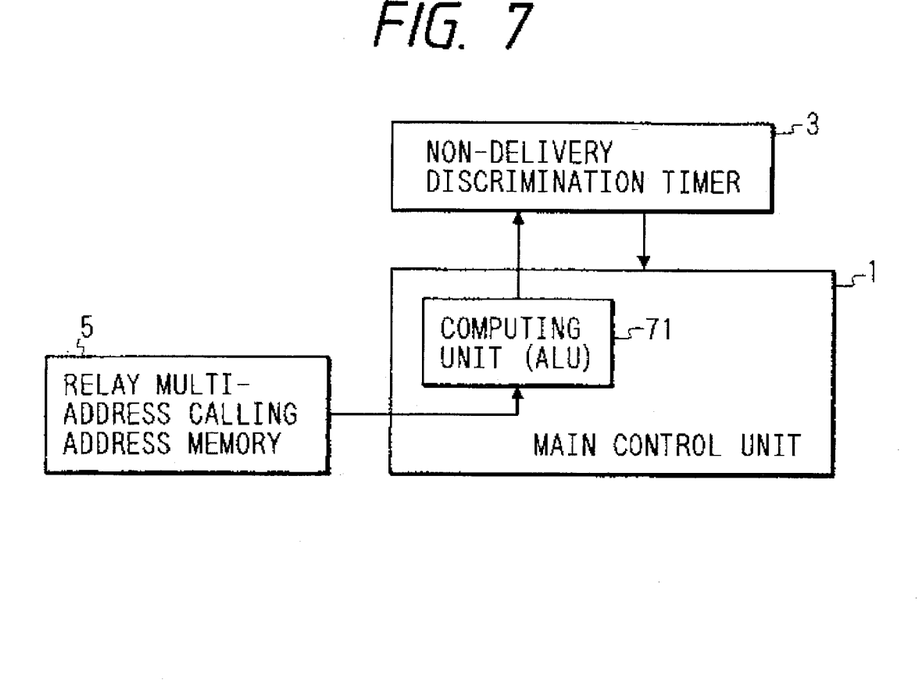
FIG. 7 shows a block diagram for setting the non-delivery check time in accordance with a product of the number of pages of images and the number of relay destination stations.

(4) It is set in accordance with the number of relay destination stations for the relaying multi-address transmission. For example, as shown in FIG. 7, the information on the number of relay destination stations for the relaying multi-address transmission is read from the relaying multi-address transmission station address memory 5, and the non-delivery check time is calculated based thereon by an ALU 71 in the main control unit 1 and it is set in the non-delivery check timer 3. This method also permits the setting which fits to the actual status with less burden of the user.

(5) As a combination of the methods (4) and (3) for determining the non-delivery check time, it may be set in accordance with a product of the number of pages of the images to be sent in the relaying multi-address transmission and the number of relay stations and relay destination stations.

Figure 8:
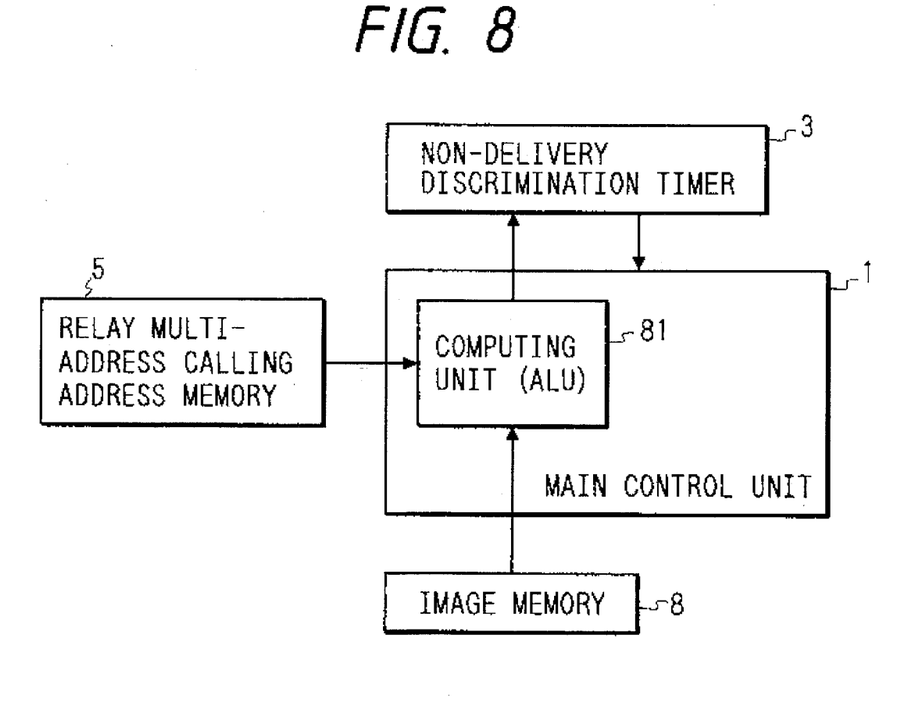
FIG. 8 shows a block diagram for setting the non-delivery check time in accordance with the number of relay destination stations.

For example, as shown in FIG. 8, the information on the number of pages of the images to be sent in the relaying multi-address transmission is read from the image memory 8, the information on the number of relay destination stations is read from the relaying multi-address transmission address memory 5, and a product of those is calculated by an ALU 81 of the main control unit 1 to calculate the non-delivery check time, which is then set in the non-delivery check timer 3. This method permits the setting which more fits to the actual status than the method (3) or (4) does.

When such a preset time has elapsed, the non-delivery check timer 3 informs it to the main control unit 1. If the relay result information is received from all relay stations before that time, it is necessary to reset the non-delivery check timer 3.

Whether the relay result information has been received from all relay stations or not may be checked by referring a relay result field of the relaying multi-address transmission address memory 5 shown in FIG. 9.

As shown in FIG. 2, an error has occurred in the transmission from the sending station 21 to the relay station 22 and it is clear that there is no relay result information sent from the relay station 22. Thus, the main control unit 1 of the sending station 21 puts marks X (which may actually be an appropriate code such as "1" or "0" in the memory stored information) in the relay result fields of the relay station 22 and the relay destination stations 25 and 26.

In FIG. 9, the relay result information has been received from the relay stations 23 and 24 and the information indicating the normal transmission has been recorded in the relay result field.

Figure 12:
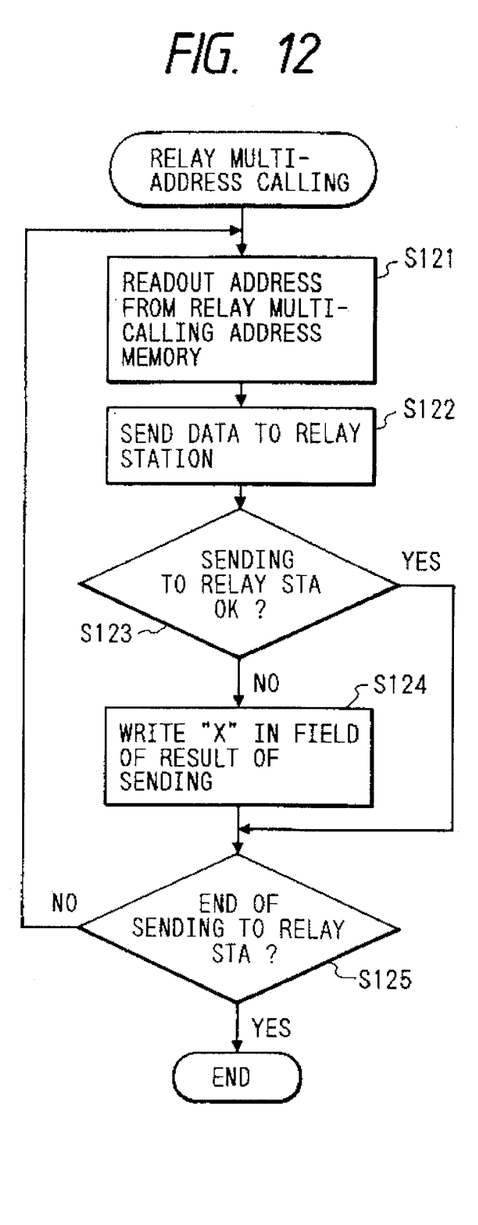
FIG. 12 shows a flow chart of a relaying multi-address transmission operation when the facsimile device which embodies the present invention is a sending station.

FIG. 12 shows a control procedure of the main control unit 1 in the relaying multi-address transmission by the sending station 21. In a step S121, the relay destination address designated by the user is read. In a step S122, the image and the relay destination information are sent to the relay station. If the transmission to the relay station is not normal, the mark X is put in the relay result field of the relaying multi-address memory 5 (steps S123 and S124).

Figure 13:
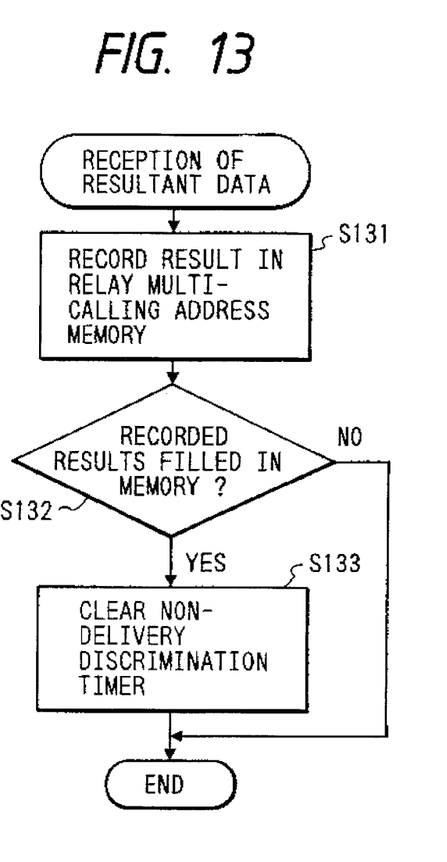
FIG. 13 shows a flow chart of relay information reception operation when the facsimile device which embodies the present invention is the sending station.

FIG. 13 shows the control in the sending station when the relay result information is received from the relay station. The result is recorded in the relaying multi-address transmission address memory 5 (step S131), and if the record sheet jams, the non-delivery check timer 3 is cleared (steps S132 and S133).

In this manner, the sending station can identify the existence of the relay destination station to which the relaying multi-address transmission is not perfectly conducted to the last step and the image is not delivered.

The non-delivered relay destination is determined based on the address information of the relay destination station stored in the relay destination address memory 4 of the relay station. As shown in FIG. 10, the transmission result information is added to the relay destination address memory 4 and it is sent to the sending station 21 as the relay result information. The relay destination address memory of the relay station 24 shown in FIG. 10 is for the non-delivery in the transmission to the relay destination station 29.

In this manner, the sending station can identify the non-delivered station and the address thereof and the information may be stored and managed in the non-delivered station address memory 6 (until the relay operation is completed or cumulatively for a longer period) and it may be used for the communication management of the user by printing it out as required.

Figure 11:
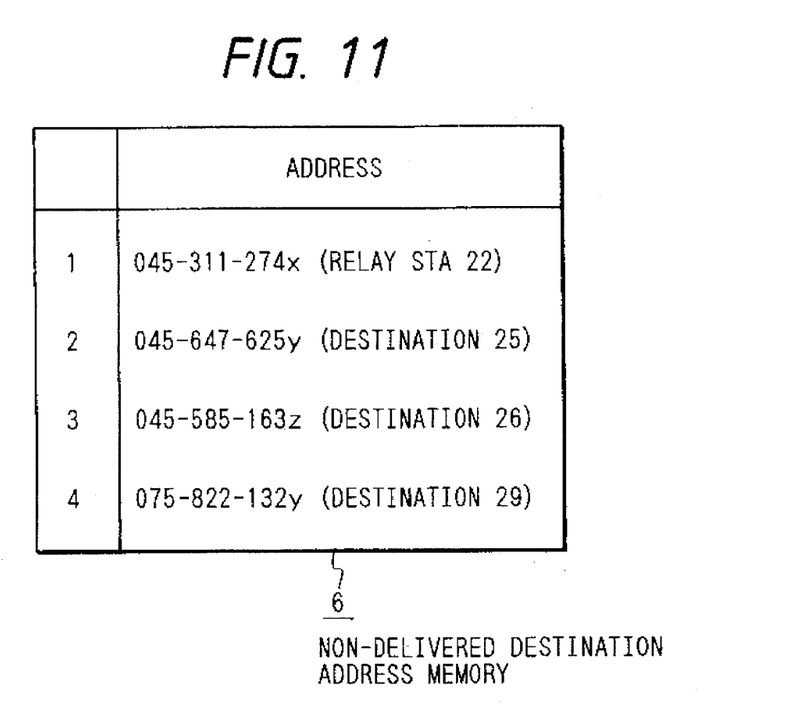
FIG. 11 shows a content of a non-delivered station address s memory.

The information managed by the non-delivered station address memory 6 of the sending station is shown in a table of FIG. 11. The table of FIG. 11 is prepared by combining the information of FIGS. 9 and 10 based on the fact that the transmission to the relay station 22 was in error and the relay result information from the relay station 24 includes the non-delivered station. The table may be printed out by the printer 9 as required.

When the non-delivered station information is available in the non-delivered station address memory 6, the sending station 21 can directly send the image to the non-delivered station.

When the retransmission to the non-delivered station is ready, the sending station informs to the user the occurrence of error in the relaying multi-address transmission by a report printed out by the printer 9 or the display by the console unit 2.

The retransmission to the non-delivered station is then conducted. It may be done either automatically and immediately or after an instruction from the user. When the image to be retransmitted is not maintained in the image memory 9, the automatic retransmission cannot be done and the operation to be done by the user may be different. Accordingly, the image memory 8 is checked and it is noticed in the report or the display mentioned above.

Where the image to be retransmitted is maintained in the image memory 8, one of the following methods is taken to determine whether to automatically retransmit or not.

(1) Retransmit after the instruction from the user. This method allows the user discretion such as non-selection of the direct retransmission.

(2) Retransmit automatically. This method reduces the burden of the user.

Figure 15:
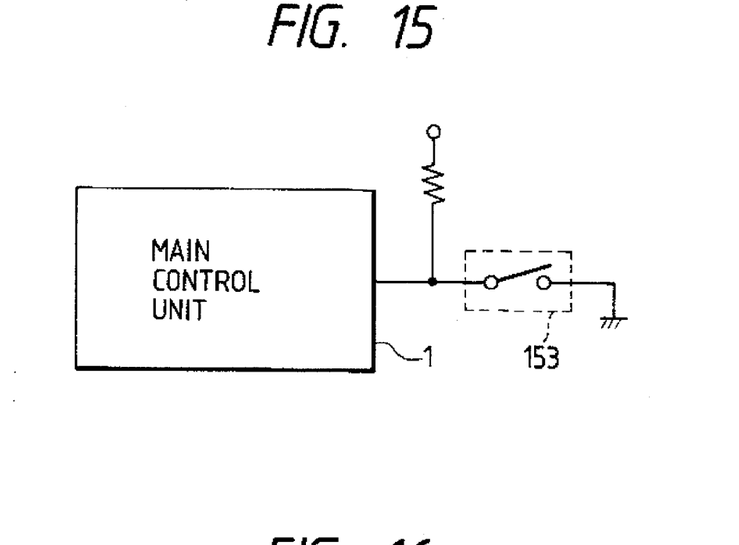
FIG. 15 shows a block diagram in which a switch for selecting whether the retransmission to the non-delivered station is to be conducted after the reception of a user instruction or automatically is provided.

(3) The retransmission after the instruction from the user or the automatic retransmission is selected by the setting of a mode switch 153 as shown in FIG. 15. This method provides the advantages of the methods (1) and (2) (although a cost increases).

When the retransmission is determined in this manner, the sending station starts the retransmission.

Figure 14:
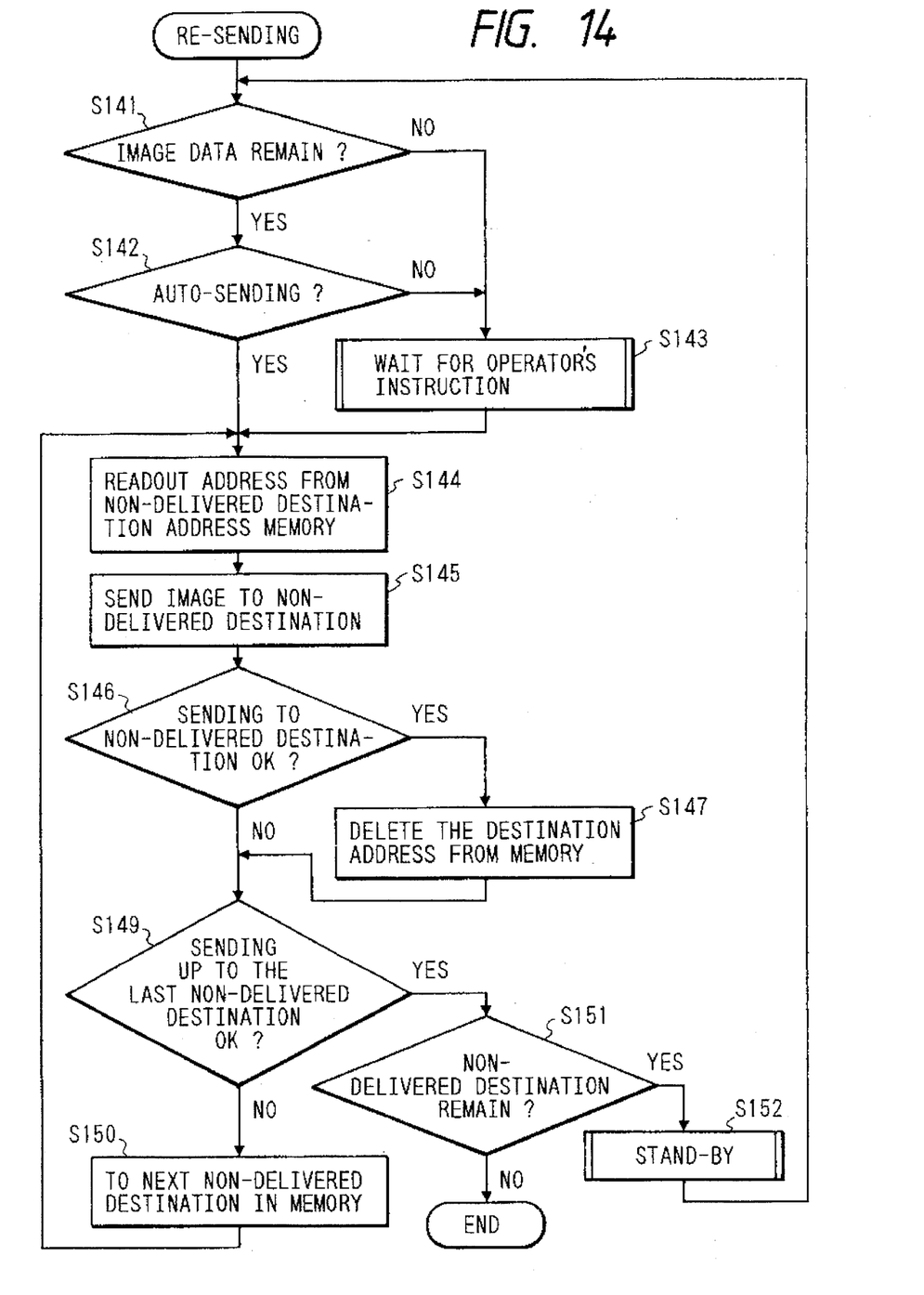
FIG. 14 shows a flow chart of retransmission to a non-delivered station when the facsimile device which embodies the present invention is the sending station.

An operation of the main control unit 1 for the retransmission (the mode switch 153 in the method (3) is used) is shown in FIG. 14.

When the retransmission is initiated in FIG. 14, the main control unit determines whether the image sent by the relaying multi-address transmission is maintained in the image memory 8 or not (step S141), and if it is maintained, it determines whether the setting of the switch 153 is automatic or not (step S142).

If it is automatic, the next step (step S144) is immediately started. If the image is not maintained or if the setting is not automatic, the process stands by until the user manipulates for the retransmission (step S143 ).

When the user manipulates for the retransmission, the main control unit 1 reads the non-delivered station addresses from the non-delivered station address memory 6 (step S144) and sends the image thereto (step S145). The completion of the transmission is monitored (step S146) and if it is completed, the destination addresses are erased from the non-delivered station address memory 6 (step S147). The non-delivery information may not be erased immediately after the direct transmission but the latest information may be stored as communication management information for a predetermined period or for a predetermined number of communication.

Whether the transmission has been made up to the end of the non-delivered station address memory 6 or not is determined (step S149), and if the transmission is not complete, the address readout and the transmission are conducted for the next non-delivered station in the non-delivered station address memory 6 (step S150).

When the transmission has been made to the end of the non-delivered station address memory 6, whether a non-delivered station still remains in the non-delivered station address memory 6 or not is checked (step S151), and if it remains, the process stands by for a while (step S152) and the retransmission is conducted until the non-delivered station disappears. When the non-delivered station does not remain, the retransmission is terminated.

When the retransmission is conducted after the instruction is received from the user or automatically as in the method (1) or (2), the process may be proceeded without checking (step S142) whether the setting is automatic or not.

In accordance with the present embodiment, if the non-delivery occurs in the relaying multi-address transmission, the image is retransmitted by the direct transmission to the non-delivered station so that the image data reaches the relay destination station without failure.

Because of the direct transmission to the non-delivered station, there is no uncertainty even if the status of the relay station or the communication line to the relay station is bad, and the image data can reach the relay destination station quickly and without failure.

When the number of non-delivered stations is very small (as it normally happens), the relaying multi-address transmission is retried. In this manner, the burden of the relay station is reduced and the communication cost is saved.

Further, since almost all of the possible routes for the occurrence of non-delivery are taken into consideration, the non-delivery which may occur in various manners is detected without failure and it is used for the control of retransmission.

In the above embodiment, the relay destination addresses are designated by the sending station. Alternatively, the relay station may store the relay destination addresses in group and the sending station may designate a group.

In this case, however, it is necessary for the relay station to inform the non-delivery station address to the sending station, and the sending station need to have a non-delivered station address memory 6 as shown in FIG. 11 based on the address information stored in the relay destination address memory 4 shown in FIG. 10, received from the relay station.

Figure 16:
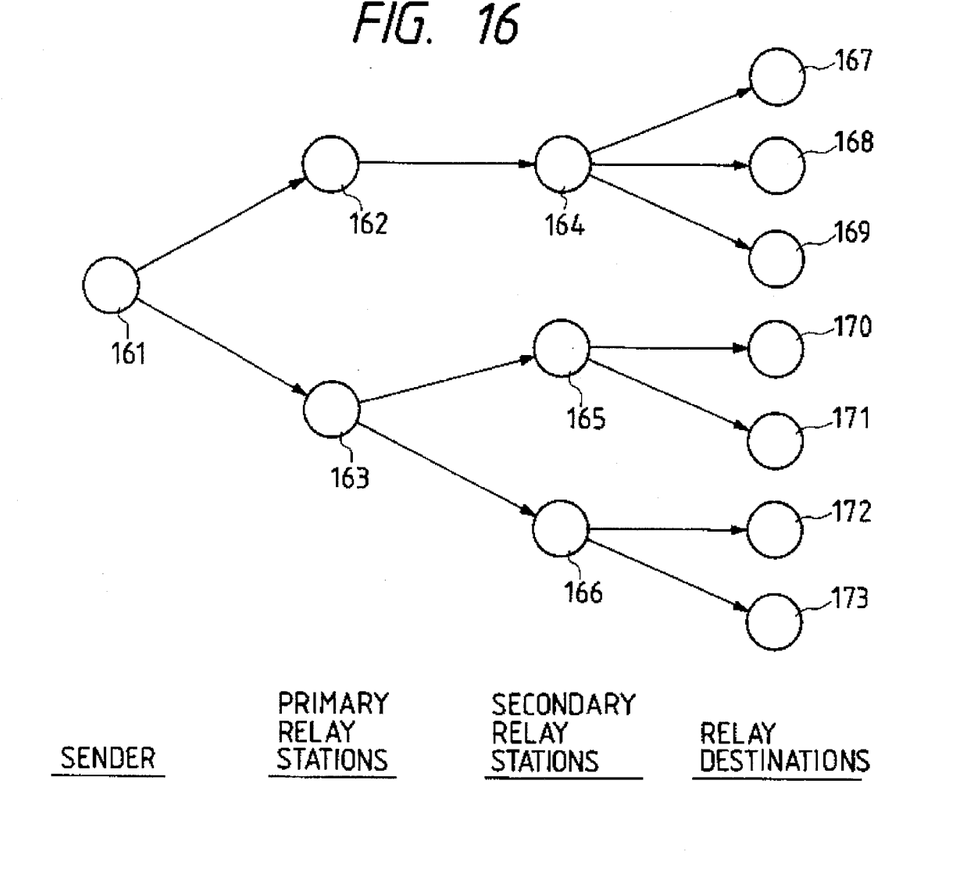
FIG. 16 illustrates an operation when another embodiment of the facsimile device of the present invention is used.

The present invention is also applicable to the two-step (or higher) relaying multi-address transmission as shown in FIG. 16. In this case, a primary relay station stores the relay multi-address transmission information sent from the sending station into the relaying multi-address transmission address memory 5 and conducts the relaying multi-address transmission to a secondary relay station as the sending station of the previous embodiment does and stores the relay result information in the relaying multi-address transmission address memory 5, and it sends the information of the relaying multi-address transmission address memory 5 to the sending station, which stores the relay result information in the relaying multi-address transmission address memory of the sending station based on the information therefrom and prepares the non-delivered station address for the direct transmission to the non-delivered station.

The relay destination address memory 4, the relaying multi-address transmission address memory 5 and the non-delivered station address memory 6 may be formed on one memory, and the non-delivery check timer 3, the ALU's 61, 71 and 81 and the switch 153 may not be independent hardware but may be attained as software functions of the main control unit 1.

The present invention is not limited to the above embodiments but various modifications thereof may be made.

What is claimed:

1. A data communication apparatus for requesting relaying multi-address transmission for instructing the relaying multi-address transmission from a data communication apparatus at a relay requesting station to a data communication apparatus at a relay station and sending the data received by the data communication apparatus at the relay station to a plurality of designated destination stations in multi-address transmission mode in accordance with the instruction, comprising:

memory means for storing image data to be multi-address transmitted;

transmission means for transmitting to a relay station the image data stored in said memory means;

means for detecting occurrence of non-delivery status in which the image data transmitted by said transmission means was not sent correctly to a relay destination station; and control means for reading out from said memory the image data transmitted to the relay station and directly retransmitting the read-out data to the relay destination station without routing through the relay station when the non-delivery status has been detected by said detection means.

2. A data communication apparatus according to claim 1, wherein said detection means detects the occurrence of the non-delivery status when said detection means detects that the data transmission to the relay station has not been sent correctly, or relay result information sent from the relay station reports the occurrence of the non-delivery status, or the relay result information is not sent from the relay station within a predetermined non-delivery check time.

3. A data communication apparatus according to claim 2, further comprising means for allowing a user to set said predetermined non-delivery check time.

4. A data communication apparatus according to claim 2, further comprising means for setting said non-delivery check time in accordance with an amount of data to be relayed.

5. A data communication apparatus according to claim 2, further comprising means for setting said non-delivery check time in accordance with a number of relay destination stations to which the data is to be relayed.

6. A data communication apparatus according to claim 2, further comprising means for setting said non-delivery check time in accordance with a product of an amount of data to be relayed and number of relay destination stations to which the data is to be relayed.

7. A data communication apparatus according to claim 1, further comprising means for allowing a user to instruct direct transmission when the non-delivery status is detected and the data is to be transmitted to the relay destination station without routing through the relay station.

8. A data communication apparatus according to claim 7, further comprising means for allowing a user to select whether the direct transmission is to be conducted automatically or in accordance with a user instruction when the non-delivery status is detected and the data is to be transmitted to the relay destination station without routing through the relay station.

9. A method of relaying multi-address transmission for instructing the relaying multi-address transmission from a data communication apparatus at a relay requesting station to a data communication apparatus at a relay station and sending the data received by the data communication apparatus at the relay station to a plurality of designated destination stations in multi-address transmission mode in accordance with the instruction, comprising the steps of:

detecting the occurrence of non-delivery status during the multi-address transmission mode at a non-delivered one of said designated destination stations; and retransmitting the data transmitted to the relay station directly from the data communication apparatus at the relay requesting station without routing through the relay station when the non-delivery status has been detected.

10. A method of relaying multi-address transmission according to claim 9, wherein said detection step detects the occurrence of the non-delivery status when the data transmission to the relay station has not been sent correctly, or relay result information sent from the relay station reports the occurrence of the non-delivery status, or the relay result information is not sent from the relay station within a predetermined time.

* * * * *

UNITED STATES PATENT AND TRADEMARK OFFICE
CERTIFICATE OF CORRECTION

PATENT NO. : 5,585,854
DATED : December 17, 1996
INVENTOR(S) : TSUNEHIRO MAKINO

It is certified that error appears in the above-identified patent and that said Letters Patent is hereby corrected as shown below:

COLUMN 1

Line 31, "resend" should read --resends--; and
    Line 48, "rare" should read --a rare--.

COLUMN 2

Line 42, "s memory," should read --memory,--.

COLUMN 5

Line 42, "more fits" should read --is more fitted--.

COLUMN 9

Line 19, "and" should read --and a--.

Signed and Sealed this

Twenty-third Day of September, 1997

Attest:

BRUCE LEHMAN

*Attesting Officer*    *Commissioner of Patents and Trademarks*